US008438268B2

(12) United States Patent  
Mills

(10) Patent No.: US 8,438,268 B2  
(45) Date of Patent: May 7, 2013

(54) METHOD AND APPARATUS FOR ALERT PRIORITIZATION ON HIGH VALUE END POINTS

(75) Inventor: Christopher Lee Mills, Wenham, MA (US)

(73) Assignee: CA, Inc., Islandia, NY (US)

( * ) Notice: Subject to any disclaimer, the term of this patent is extended or adjusted under 35 U.S.C. 154(b) by 902 days.

(21) Appl. No.: 12/108,173

(22) Filed: Apr. 23, 2008

(65) Prior Publication Data

US 2009/0271792 A1   Oct. 29, 2009

(51) Int. Cl.
*G06F 15/177* (2006.01)
*G06F 15/173* (2006.01)
*H04L 12/28* (2006.01)
*H04B 7/00* (2006.01)

(52) U.S. Cl.
USPC ............ 709/224; 709/222; 370/256; 370/310

(58) Field of Classification Search .................... 709/244
See application file for complete search history.

(56) References Cited

U.S. PATENT DOCUMENTS

| 6,249,885 | B1 | 6/2001 | Johnson et al. | |
|---|---|---|---|---|
| 6,847,892 | B2 * | 1/2005 | Zhou et al. | 701/213 |
| 6,889,264 | B2 | 5/2005 | Clough et al. | |
| 6,972,682 | B2 * | 12/2005 | Lareau et al. | 340/568.1 |
| 7,010,594 | B2 | 3/2006 | Defosse | |
| 7,127,441 | B2 | 10/2006 | Musman | |
| 7,301,450 | B2 * | 11/2007 | Carrino | 340/539.11 |
| 7,382,247 | B2 * | 6/2008 | Welch et al. | 340/539.12 |
| 7,614,065 | B2 * | 11/2009 | Weissmueller et al. | 725/22 |
| 2003/0115591 | A1 * | 6/2003 | Weissmueller et al. | 725/22 |
| 2005/0206518 | A1 * | 9/2005 | Welch et al. | 340/539.12 |
| 2005/0216941 | A1 * | 9/2005 | Flanagan et al. | 725/88 |
| 2006/0161946 | A1 * | 7/2006 | Shin | 725/33 |
| 2006/0198378 | A1 * | 9/2006 | Rajahalme | 370/395.4 |
| 2006/0248182 | A1 * | 11/2006 | Glassco et al. | 709/223 |

FOREIGN PATENT DOCUMENTS

| WO | WO 03/043204 | A2 | 5/2003 |
|---|---|---|---|
| WO | WO 2004/084720 | A2 | 10/2004 |
| WO | WO 2005/099269 | A2 | 10/2005 |
| WO | WO 2006/116866 | A1 | 11/2006 |
| WO | WO 2007/106541 | A2 | 9/2007 |

* cited by examiner

*Primary Examiner* — Wing F Chan
*Assistant Examiner* — David X Yi
(74) *Attorney, Agent, or Firm* — Myers Bigel Sibley & Sajovec, P.A.

(57) ABSTRACT

A method and system for prioritizing alerts on end points include an aggregator agent that monitors a plurality of end point agents and receives a signal indicating an out of band operating tolerance from an end point. The aggregator agent locally determines the priority of the received signal based on a rules engine local to the aggregator agent. The aggregator agent transmits the priority of said signal and information associated with said signal to a remote host computer for appropriate handling.

23 Claims, 3 Drawing Sheets

METHOD AND APPARATUS FOR ALERT PRIORITIZATION ON HIGH VALUE END POINTS

FIELD OF THE INVENTION

The present application generally relates to alerts and event management of alert systems, and more particularly to prioritizing alerts at end points.

BACKGROUND OF THE INVENTION

The ability to deliver real-time alerting is in demand from large and very large enterprises. Known intrusion prevention offerings include agent-side rules engines that monitor new types of end points such as automobiles and appliances and transmits detected intrusions to the host systems for appropriate handling. Given the new types of end points such as automobiles and appliances, the number of agents reporting or communicating the alerts to the host system can be potentially in the millions or more. The host system needs to properly manage every agent's alerts and communications and thus need the ability to manage millions of agents. It would be desirable to automate remediation and prioritize alerts so as to reduce false alerts and improve the efficiency of client-server communications

BRIEF SUMMARY OF THE INVENTION

A method, system and apparatus for prioritizing alerts on end points are provided. The method in one aspect may comprise receiving at an aggregator agent that monitors a plurality of end point agents, a signal indicating an out of band operating tolerance from an end point, and determining locally at the aggregator agent a priority of said signal based on rules engine local to the aggregator agent. The method may further comprise transmitting said priority of said signal and information associated with said signal to a remote host computer for appropriate handling.

A method of prioritizing alerts on end points, in another aspect, may comprise establishing an aggregator agent on a mobile object, said aggregator agent enabled to monitor a plurality of end point agents each associated with an asset carried on the mobile object. The aggregator agent may be enabled to receive signals indicating out of band operating tolerance from said plurality of end point agents. The aggregator agent may be further enabled to determine locally priorities of said signals based on rules engine local to the aggregator agent. The method may further comprise receiving at a host computer said priorities of said signals and information associated with said signals from said aggregator agent, and handling at said host computer said signals based on said priorities.

A system for prioritizing alerts on end points, in one aspect, may comprise an aggregator agent located in a local environment and monitoring a plurality of end point agents each attached to an asset located in said local environment. The aggregator agent may be operable to receive signals from said end point agents. A rules engine comprises a plurality of rules for handling signals from said end point agents. The rules engine may be located in said local environment. The aggregator agent prioritizes said signals received from said end point agents based on said plurality of rules and information associated with said local environment and said asset.

A program storage device readable by a machine, tangibly embodying a program of instructions executable by the machine to perform the above-described methods may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
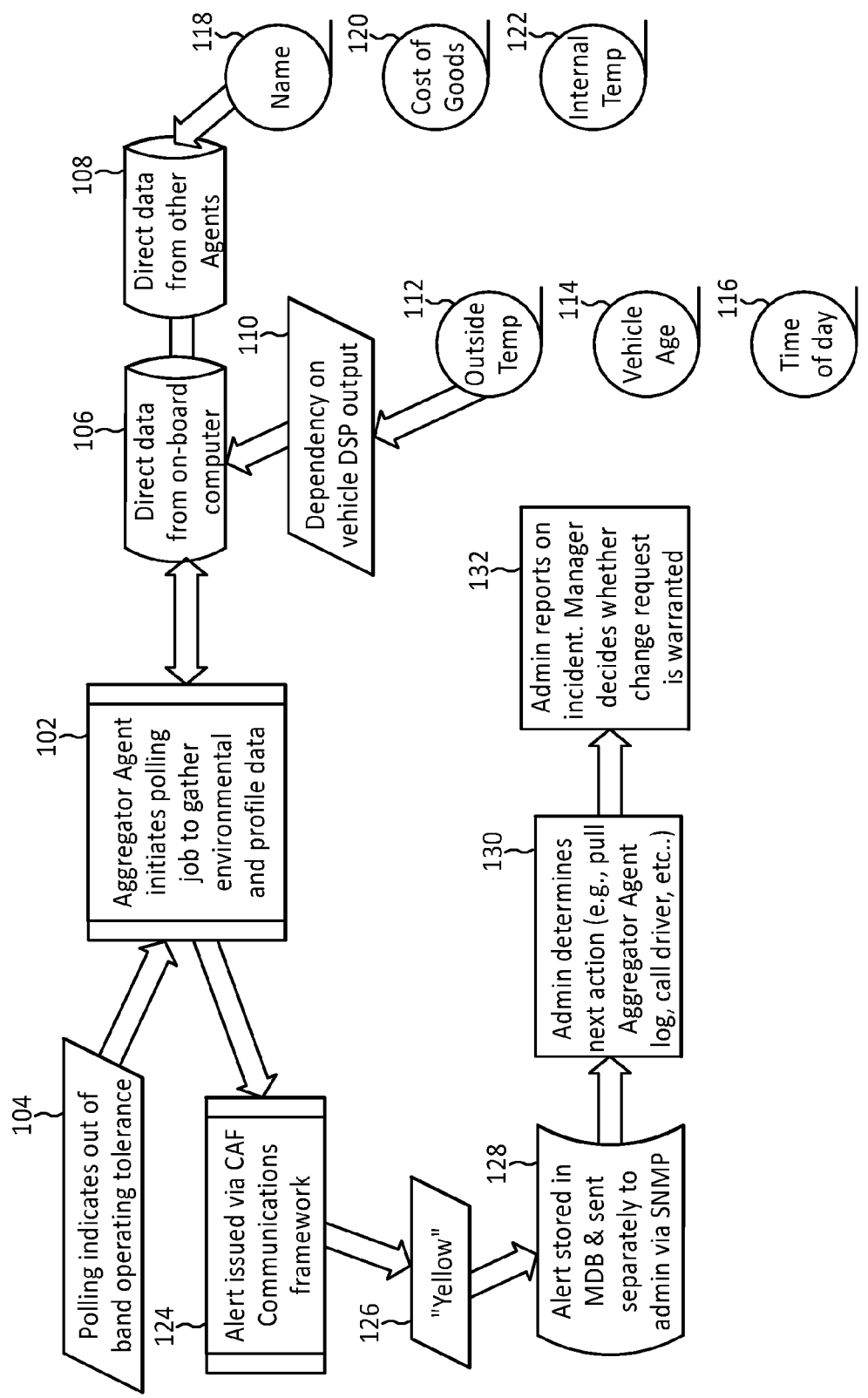
FIG. 1 is a flow diagram illustrating an example scenario and a method and system of the present disclosure applied to the scenario.

The method and apparatus are presented in one embodiment that prioritize alerts based on rules that run locally on the end point, and automatically advance those that cannot remediate automatically to a high priority queue for administrative action. A method and apparatus in one embodiment provides prioritization data along with alerts sent from end points, resulting in the automatic promotion of high-priority alerts ahead of other traffic in the notification queue. This capability increases the effectiveness of end point security scanning products, e.g., anti-virus and anti-malware software from vendors like McAfee and Symantec, by validating potentially harmful changes on the end point and deprioritizing alerts raised against low-value end points. For instance, the inability to communicate with an entry-level employee's smart phone may not require an administrative alert, whereas the inability to communicate with a senior executive's smart phone may require one, depending on the risk to the business or the type of information kept on the host device.

A method and apparatus in one embodiment is illustrated with reference to an example in which an agent is running on a mobile device and is designed to ensure temperature constancy in a refrigerated truck. This device could be configured to raise a temperature rise alert only after first checking the electronic manifest to determine the number of frozen goods that remain aboard. If the electronic manifest indicates that the combined value of the remaining deliveries falls below a certain dollar threshold, the system may determine that no emergency action is warranted, and the alert might be sent to the standard warning queue. The method and apparatus in one embodiment may include an "aggregator" agent that may be set up or configured to process alerts based on configuration changes that exceed thresholds established by an information technology (IT) policy governing the managed system. Instead of immediately forwarding the alerts to the runtime communications layer, a layer of abstraction may attempt to locally perform root cause and risk analysis.

This may include running scripts to re-poll the systems that provide metrics to the intelligent aggregator agent or aggregator agent running on the mobile device. Additional policies may be also established for the aggregator agent to perform one or more actions before, during or after re-polling the system to refresh data collection or collect data from the system. Action put in place according to additional policies may include but are not limited to checking for updated policy or configuration changes. Using heuristics, a rules engine on the mobile device may compare the current system status against a stored benchmark set of configurations. In general, a device such as personal computer (PC) or mobile device can be referred to as a "host device". For example, "host" may be where the intelligent agent lives or is associated with. End points are where the electronic tags or like are attached. In this disclosure, "aggregator agent" or "intelligent aggregator agent" refers to an agent located at or associated with the host. Alternatively or additionally, aggregator agent may be a device on its own that includes intelligence or logic capabilities, and is enabled to collect and communicate data. "Alerting agent" refers to an agent that is associated with or located at the end point. Alerting agents are also referred to interchangeably as end point agents.

If the resulting "health index" yields a set of differences that the rules engine is set up to correct automatically (e.g., by running a subsequent script, or retrieving a patch), the system would automatically remediate. If remediation is not possible, but the health check indicates a low risk due to prolonged non-compliance in terms of impact to the intelligent aggregator itself or surrounding managed assets, then a simple exception alert would be raised. For those alerts that do not qualify for automatic remediation and present a high risk based on the health check, a priority alert would be sent to the front of the admin queue.

The ability to map non-compliant changes affecting end points to a set of automated actions and rules governing how alerts are raised dramatically reduces false alerts, allowing client systems administrators and security personnel to focus their time and resources on the most critical remediation tasks.

FIG. 1 is a flow diagram illustrating an example scenario and a method and system of the present disclosure applied to the scenario. A refrigerated truck is carrying a load of refrigerated goods. Each of the items has a small electronic tag or like that runs an "end point alerting" agent capable of communicating wirelessly to host devices. In addition to the end point alerting agent, the tag may contain a small read/write cache. In one embodiment, there is no persistent storage on the agent end points. The delivery vehicle may have a standard client PC wireless LAN or like. It runs an intelligent aggregator agent that wirelessly polls the various managed agents in groups, delivers updates, and runs a rules engine that controls how to process alerts. The intelligent aggregator agent can simultaneously track many, for example, thousands, of discrete end point alerting agents by wirelessly polling for data or status from the alerting agents. The aggregator agent in one embodiment houses the "intelligence" that decides how an agent alert is to be prioritized.

The delivery company is sensitive to any changes in the internal temperature of the goods being shipped. It tracks the status of each refrigerated asset. Assets that are successfully delivered are removed from the system, possibly through integration with a bar code scanning system. The aggregator agent also has access to operating information derived from the vehicles' own onboard computer, as well as a list of standard attributes assigned to the vehicle itself.

In this example use case, the internal temperature of one or more assets has dropped below a specific temperature deemed acceptable, based on that particular class of asset type. Typically, such an alert would immediately trigger an alert back to the company or company's host system, for the administrator to handle. The alert would simply indicate that there seems to be a problem with the on board temperature in vehicle XX. The system and method of the present disclosure provides a customized or intelligent agent to behave more intelligently. Instead of immediately calling for remediation (e.g., dispatching a call to the driver and/or preparing for on-site goods transfer), the intelligent aggregator agent performs automated investigation that results in an alert that accurately summarizes the risk of the breach to the organization.

In one embodiment in this example scenario, the aggregator agent receives a signal from an alerting agent residing with or attached to the item or asset when deviation from the norm is detected in that asset, for example, a drop in the temperature. The alert signal may be issued from the alerting agent or picked up by the intelligent aggregator agent via polling. Instead of immediately triggering a standard alert, for example, when polling shows that the internal temperature of one or more asset has exceeded the allowable threshold, the aggregator agent automatically sends a one-off polling request to all of the other agents on board, as well as the external temperature gauge. The resulting data may show that the vehicle and cooling system are new and are not malfunctioning. The reason the asset temperature has dropped is due to very hot weather, and the fact that the day's delivery run is nearly over, and the door has been opening and closing all afternoon. If the company delivers according to a normal work day, the fact that it is late afternoon may be factored in as well. With this knowledge, and perhaps even with a dollar value representing the combined value of the goods that remain on board, the aggregator agent may intelligently adjust the severity of alert, for example, from red to yellow, thus correctly prioritizing the alert. An administrator viewing the alert could issue a request to the vehicle to retrieve the latest aggregator agent log, and from this would have a clear understanding of the prioritization change.

Referring to FIG. 1, an aggregator agent residing at the client side, for example, vehicle on board computer or like, initiates polling to gather environmental and profile data as shown at 102. Shown at 104, polling indicates out of band operating tolerance, for example, one or more end point agents associated with one or more assets signal out of range or threshold data. Aggregator agent looks up local rules, for instance, from a rules engine to intelligently determine how the signal should be handled. Aggregator agent also may retrieve from the onboard computer 106 and other agents 108 associated with assets, available data in order to make an intelligent decision for handling the out of band operating tolerance indication. Data available from the onboard computer may include but is not limited to the information about the surrounding environment 110 where the assets are kept, for example, vehicle or like. Such information may include the outside temperature or weather related information 112, vehicle or container age 114, time of day 116, and any other information available that is useful in making the agent's decision. Data from individual end point agents of the assets may include, but is not limited to, name of the asset 118, cost of the asset 120, internal temperature of the asset 122, etc. and any other information about the asset that is useful in making the agent's decision. The aggregator agent then determines the severity or priority for this signal that indicated out of band operating tolerance based on the rules, and/or data or information gathered from the onboard computer and/or other agents.

The aggregator agent communicates this prioritized alert to the associated management system, processor or computer, as shown at 124 and 126. The management system then may store the alert information and forward the alert to appropriate administrators for handling as shown at 128. At 130, the administrator may determine the next course of action based on the alert prioritization. For instance, the administrator may request a log from the aggregator agent, call the driver of the vehicle or operator of the container or warehouse, or like. At 132, the administrator may also report the incident to the appropriate manager for additional handling.

The aggregator agent in one embodiment may be implemented as plug-in software, that is, a computer program that interacts with a host computer, at the client system or the client computer. In the above-described example scenario, the aggregator agent may be a plug-in to the vehicle's onboard computer and may include a user interface for interacting with the user, graphically or otherwise. The aggregator agent may be also implemented as a plug-in in mobile devices such as the smartphone or like.

As a result of the intelligent alerting plug-in that automatically remediates types of alerts occurring locally, the company will have saved the time and effort that would have been expended in responding to what was ultimately a low-cost, low-risk issue, and the driver was not disturbed or involved in any way.

Thus, the method and system of the present disclosure broadly includes an intelligent aggregator agent in a local environment that is able to prioritize or determine the severity of a condition detected in the local environment before communicating the condition to a remote, central or management system for handling. In another embodiment, depending on the type of the condition, the intelligent aggregator agent may automatically fix or remediate the condition, without, for example, involving the management system. The intelligent aggregator agent may also send a report or log of the local actions performed for recovery or correcting the conditions. The agents that are attached to assets need not be intelligent so long as they can send some sort of signal or data indicating the condition of the asset. The method and system of the present disclosure does not specifically require those agents be attached to the assets or endpoints, so long as the intelligent agent is able to assess the conditions of the assets or like, which the intelligent agent is monitoring.

Figure 2:
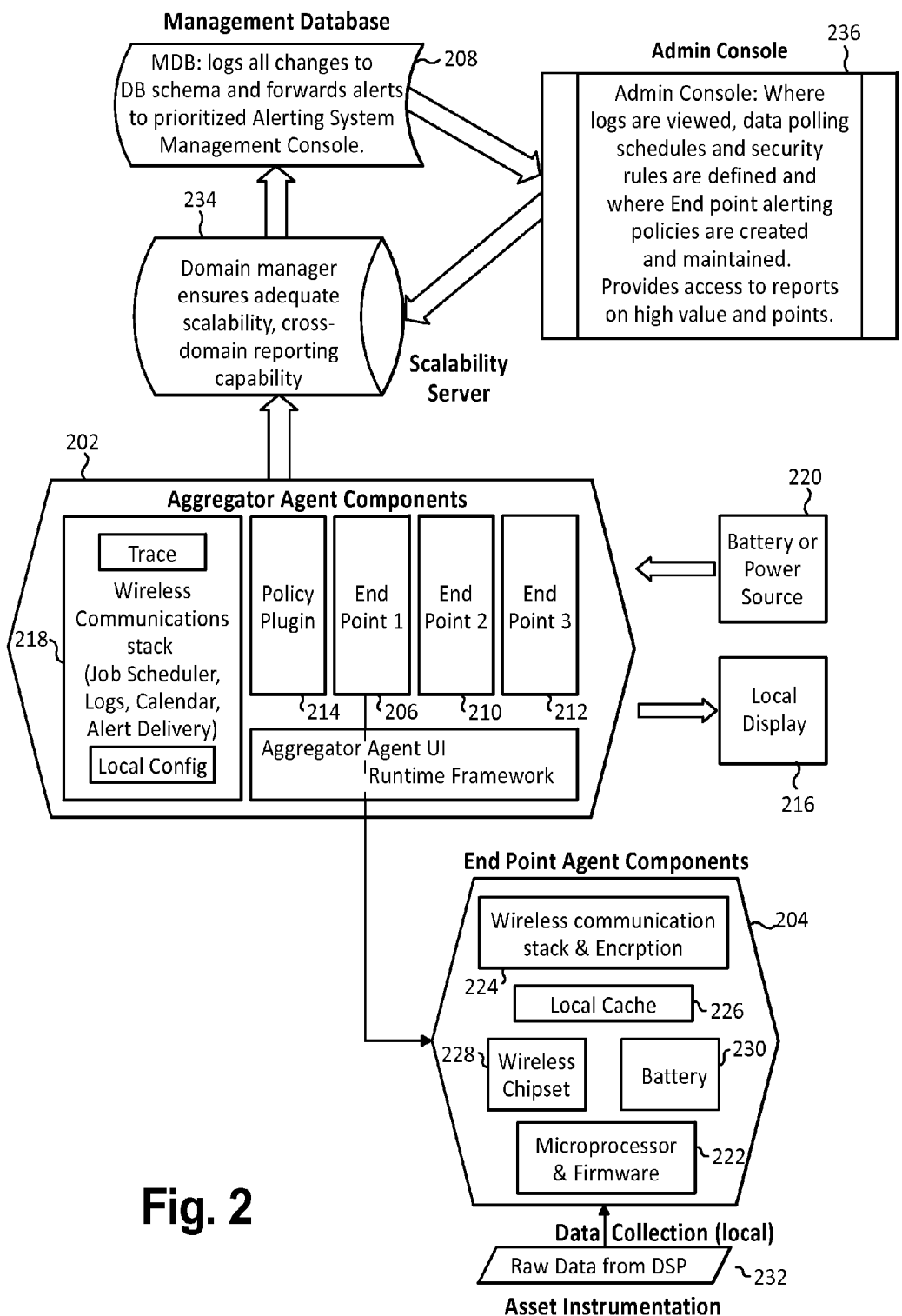
FIG. 2 is a block diagram illustrating functional components of the present disclosure in one embodiment.

FIG. 2 is a block diagram illustrating functional components of the present disclosure in one embodiment. In the normal course of a runtime environment of the method and system of the present disclosure, an aggregator agent 202 preferable runs or executes continuously and is always on. A person of ordinary skill in the technology, however, will understand, that such an agent can be turned off or shutdown manually, for instance, for maintenance, debugging, code upgrades, etc. The aggregator agent 202 maintains contact with high value end points (e.g., 204) via a corresponding endpoint interfaces, (e.g., 206) and issue prioritized alerts to Management Database (MDB) 208. The aggregator agent 202 may be embodied in a wireless enabled Client Computing device such as a smartphone or like or other computing devices, and include operating system (OS) and communications software, firmware, hardware and circuitry for performing various OS and communications functionalities of a device including but not limited to job scheduling, logging capabilities, calendar, etc., for example, as shown at 218. The aggregator agent 202 may be powered by battery or other power sources 220. The aggregator agent 202 has the ability to render information for output to a display 216, for instance, LCD or like, if available. The aggregator agent 202 communicates status of End Point Agents (e.g., 204) to MDB 208 according to a pre-defined schedule. Pre-defined schedule may specify to communicate every certain period, minutes, seconds, or like, or as an event occurs. The aggregator agent 202 monitors End Point assets by polling the corresponding End Point Agents (e.g., 204) via corresponding interfaces (e.g., 206, 210, 212).

The aggregator agent 202 may include "Policy plugin" 214 designed to process End Point Registration information and provide alert communication policies pertaining to each end point the aggregator agent 202 is monitoring. For instance, an end point's policy may instruct to send an alert when a required threshold is exceeded (e.g., the connection to a given end point agent is down). In one embodiment, Policy plugin 214 may use heuristics to increase or decrease the relative urgency of an alert. Prior to issuing an alert back to the MDB 208, the policy plugin may sweep other data sources and use the resulting data to recalculate the risk associated with an out of policy end point.

Changes to alert priority may be made by the Policy plugin 214, for instance, before initiating the Alerting mechanism (common service) of the present disclosure and notifying the MDB 208. Alerts may optionally be configured to display on the local display device 216 such as the LCD via the device user interface (UI) presentation layer.

In one embodiment, local communications are performed in real time via device OS. Remote communications are done via wireless chipset and common communications layer. In one embodiment of an implementation of the system of the present disclosure, aggregator agents do not communicate with other Aggregator agents; they are each assigned a dedicated communications port and IP address.

Like aggregator agents, end point agents (e.g., 204) in normal runtime environment are always on or running. Typically, an aggregator agent 202 monitors a plurality of end point agents, although in FIG. 2, only one is shown as an example. An end point agent 204 is a device that monitors an asset. An asset may be any item that can be monitored. In one embodiment, an end point agent 204 may include microprocessor and firmware designed to turn the end point agent off and on, self-register, and invoke sweep operation of digital signal processing (DSP) data layer. The firmware may be capable of detecting a failed registration attempt (e.g., timeout) and invoking a local alert, for instance, in the form of light or sound signal. Specific implementation of providing local alerting support may be dependent on the hardware (HW) and/or DSP inputs of the asset being monitored. An end point agent 204 may include OS and communications software, firmware, hardware, and/or circuitry, such as wireless chipset 228, wireless communications stack and encryption capabilities 224, levels of local cache 226, etc., and power source such as battery 230.

The end point agent 204 connects with an aggregator agent 202, for example, via wireless communication, and yields data when polled. Local communications are done in real time via device firmware 222. Remote communications are performed via wireless chipset 228 and adaptor. In one embodiment, the end point agent 204 is implemented to perform self-registration at initialization using, for example, registration information stored in permanent memory of the end point agent 204. Registration handshake with Aggregator Agent takes place when the device, i.e., the end point agent 204 is initialized. Registration information may contain serial number information, date of manufacture, firmware revision number, public key exchange as required, etc. If the end point agent 204 is unable to connect to the aggregator agent 202 after a predetermined number x tries, the end point agent initiates local alert (e.g., beep, or cause light on device to flash).

Once successfully registered, the system goes into "Active" mode, waiting to transmit DSP data of the asset it is monitoring. The end point agent 204 is typically attached physically to the asset it is monitoring. When the end point agent 204 detects poll request from the aggregator agent 202, the end point agent 204 sweeps the DSP 232 for real time data and transmits back to the aggregator agent 202. The firmware layer 222 of the end point agent 204 may sweep for current data such as humidity, internal temperature, shaking, on/off, time elapsed associated with the asset, and parses raw DSP output and renders the data for delivery to aggregator agent 202.

In one embodiment of the system of the present disclosure, a scalability server 234 may include a domain manager or like functionality that ensures adequate scalability, cross-domain reporting capabilities. Management database component 208 or like functionality logs changes to database schema and forwards alerts to prioritized alerting system management console 236. A system management console 236 also shown as an administrative console, or like functionality, allows for viewing or presenting of logs. Data polling schedules and security rules may be defined using the system management console 236. Likewise, the system management console 236 may be used to create and maintain the end point alerting policies. The system management console 236 also may provide accesses to reports on the end points and their alerts, for instance, high value end points.

Figure 3:
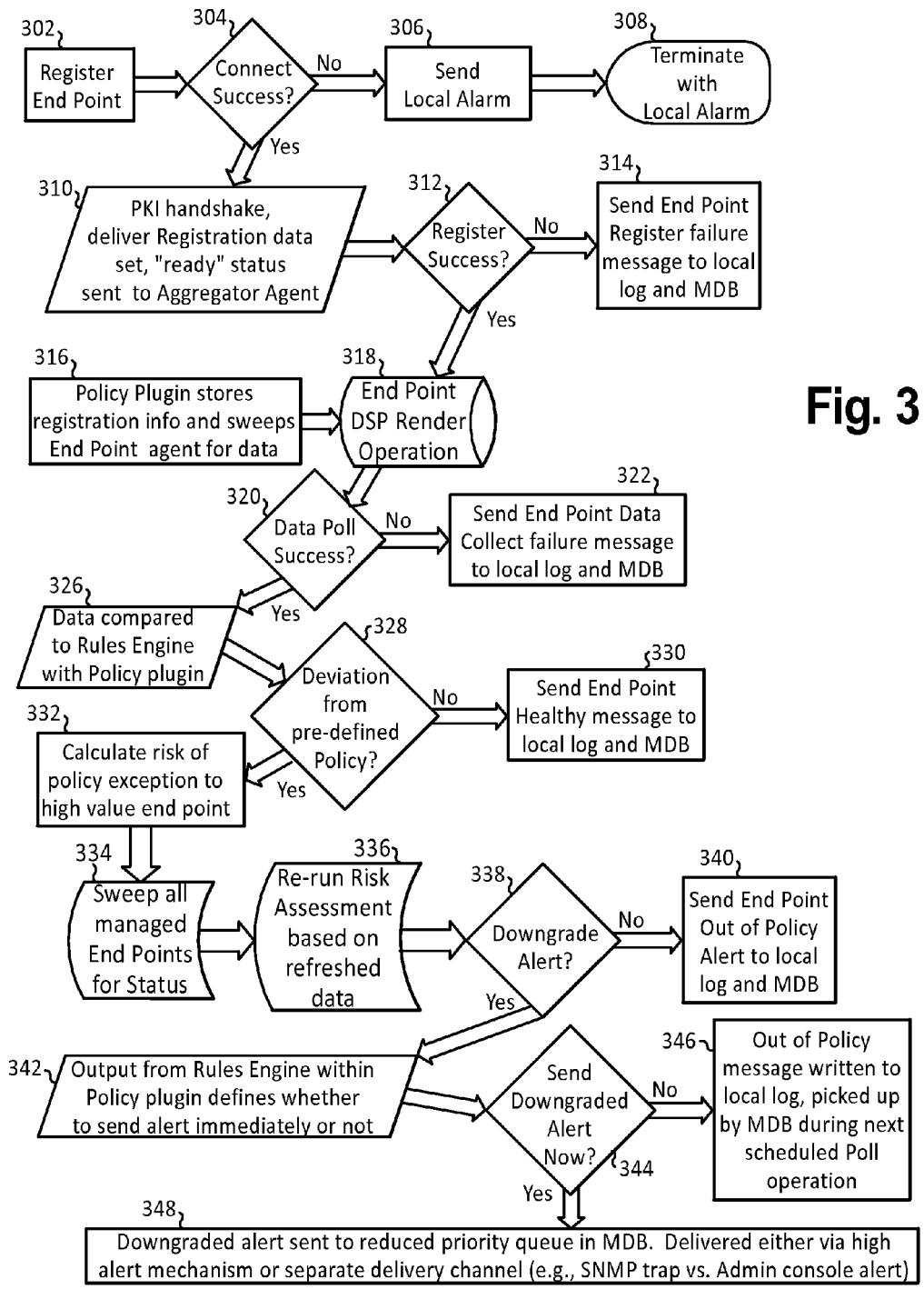
FIG. 3 is process flow diagram illustrating a process flow among functional components of the present disclosure.

FIG. 3 is process flow diagram illustrating a process flow among functional components of the present disclosure. At 302, an end point device or agent registers, that is, for instance, performs a self registration upon being booted up or turned on and connects to a corresponding aggregator agent. At 304, if the connection is not successful, the end point agent sends a local alarm at 306, for instance, by means of flashing light, beeping sound, etc. or like, locally on the device. Then at 308, the end point agent terminates. At 304, if the connection was a success, connection is established with the aggregator agent, communication handshaking performed and the end point agent registers with the aggregator agent to be ready to communicate at 310. At 312, if the registration with the aggregator agent fails, aggregator agent at 314 sends a notice to the local log and management database of the failure to register this particular end point agent.

If at 312, the registration is successful, the policy plugin of the aggregator agent stores the registration information associated with the end point agent, sweeps or polls the end point agent for data at 316. At 318, in response to the request for data from the aggregator agent, the end point agent reads data from the asset it is monitoring, renders the data, typically a raw digital signal, into an aggregator agent readable structure, and sends to the requesting aggregator agent. At 320, if the data poll is success, that is, aggregator agent polled data is received from the end point agent successfully, the processing continues to 326. Otherwise, if the data poll failed, the aggregator agent, at 322, sends end point data collect failure message to its local log and the management database or like functionality, typically a remote system.

At 326, the policy plugin functionality of the aggregator engine compares the received data and evaluates the data in light of the rules engine, that for example, specifies various rules for handling data. At 328, if no deviation from pre-defined policy is detected as a result of the evaluation, the aggregator agent sends end point healthy message to local log and the management database or like functionality at 330. On the other hand, if at 328, deviation from pre-defined policy is detected as a result of the evaluation, the aggregator agent, for example, its policy plugin, evaluates and determines the risk of policy exception to high value end point at 332. As a part of this evaluation, the aggregator agent may poll or sweep all managed end points for status at 334, and rerun risk assessment based on the refreshed or newly polled and received data at 336. If at 338, as a result of reassessing the status, the original alert could be downgraded, the process continues to 342. Otherwise, at 340, if the alert is not one to be downgraded, the aggregator agent sends end point out of policy alert to its local log and the management database or like functionality.

At 342, another evaluation may be performed using the rules engine, for example, within the policy plugin, to determine whether or not to send the alert immediately. At 344, if it is determined that the downgraded alert need not be sent immediately, the aggregator agent writes an out of policy message to its local log at 346. This alert written to the local log may be picked up by MDB during the next scheduled poll operation between the MDB and the aggregator agent. If at 346, it is determined that the downgraded alert should be sent immediately, at 348, the aggregator agent sends the downgraded alert to the MDB or like, for example using a reduced priority queue associated with the MDB. This message may be delivered via high alert mechanism or separate delivery channel, for example, simple network management protocol (SNMP) trap or administrative console alert.

Various aspects of the present disclosure may be embodied as a program, software, or computer instructions embodied in a computer or machine usable or readable medium, which causes the computer or machine to perform the steps of the method when executed on the computer, processor, and/or machine.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit of scope of the invention as defined in the appended claims.

I claim:

1. A method of prioritizing alerts on end points, comprising:
   receiving at an aggregator agent that monitors a plurality of end point agents, a signal indicating an out of band operating tolerance from an end point asset;
   in response to receiving the signal, gathering at the aggregator agent, information associated with a local environment where the end point asset is located, at least by retrieving data available on a computer running the aggregator agent and by querying one or more other end points agents respectively associated with one or more other end point assets, wherein the aggregator agent, the end point asset and the other end point assets are co-located in the local environment;
   determining locally at the aggregator agent a priority of said signal based on a rules engine local to the aggregator agent and at least based on the gathered information;
   transmitting said priority of said signal and information associated with said signal to a remote host computer for appropriate handling;
   wherein the step of determining locally at the aggregator agent a priority further includes downgrading priority of said signal and writing to a local log information associated with the downgraded priority of said signal without immediately sending the priority of said signal to the remote host computer; and wherein the step of determining locally at the aggregator agent a priority of said signal further includes re-polling for data from the plurality of end point agents and reassessing said priority based on the repolled data.

2. The method of claim 1, wherein the step of receiving at an aggregator agent includes said aggregator agent polling said plurality of end point agents for profile data.

3. The method of claim 2, wherein the step of determining locally at the aggregator agent further includes using said profile data to determine said priority.

4. The method of claim 3, wherein the step of determining locally at the aggregator agent further includes gathering environment data associated with environment where said aggregator agent is located.

5. The method of claim 1, wherein said local environment is a mobile object.

6. The method of claim 5, wherein said aggregator agent is a plug-in to an onboard computer of the mobile object and said plurality of end point agents are each attached to an item carried in the mobile object.

7. The method of claim 5, wherein said mobile object is a vehicle.

8. A method of prioritizing alerts on end points, comprising:

executing an aggregator agent on a mobile object, said aggregator agent enabled to monitor a plurality of end point agents each associated with an asset carried on the mobile object, said aggregator agent further enabled to receive signals indicating out of band operating tolerance from said plurality of end point agents, said aggregator agent in response to receiving a signal indicating out of band operating tolerance, further enabled to gather information associated with the mobile object, at least by retrieving data available on a computer on the mobile object and by querying one or more other end point agents in the mobile object, said aggregator agent further enabled to determine locally priorities of said signals based on a rules engine local to the aggregator agent and at least the gathered information; and receiving at a remote host computer said priorities of said signals and information associated with said signals from said aggregator agent;

handling at said host computer said signals based on said priorities;

wherein the step of determining locally at the aggregator agent a priority of one of said signals further includes downgrading priority of said signal and writing to a local log information associated with the downgraded priority of said signal without immediately sending the priority of said signal to the remote host computer; and wherein the step of determining locally at the aggregator agent a priority of said signal further includes re-polling for data from the plurality of end point agents and reassessing said priority based on the repolled data.

9. The method of claim 8, further including requesting a log from said aggregator agent.

10. A system for prioritizing alerts on end points, comprising:

a processor;

an aggregator agent located in a local environment, executing on the processor, and monitoring a plurality of end point agents each attached to an asset located in said local environment, said aggregator agent operable to receive signals from said end point agents;

a rules engine comprising a plurality of rules for handling signals from said end point agents, said rules engine located in said local environment;

said aggregator agent gathering information associated with the local environment, at least by retrieving data available on a computer running the aggregator agent and by querying one or more other end point agents in the local environment in response to receiving a signal that an end point asset has reached out of band tolerance, said aggregator agent determining locally a priority of said signals received from said end point agents based on said plurality of rules and information associated with said local environment and said asset, and sending said priority of said signals and information associated with said signals to a remote host computer for appropriate handling;

wherein the aggregator agent determines the priority of one of said signals by downgrading priority of said signal and writing to a local log information associated with the downgraded priority of said signal without immediately sending the priority of said signal to the remote host computer; and wherein the aggregator agent determines the priority of said signal by re-polling for data from the plurality of end point agents and reassessing said priority based on the repolled data.

11. The system of claim 10, further comprising the remote host computer operable to receive and handle one or more prioritized signals from said aggregator agent.

12. The system of claim 10, wherein said local environment is a mobile object.

13. The system of claim 10, wherein said aggregator agent is a plug-in program operable to execute on a computer in said local environment.

14. The system of claim 10, wherein said local environment is a vehicle.

15. A program storage device readable by a machine, tangibly embodying a program of instructions executable by the machine to perform a method of prioritizing alerts on end points, comprising:

receiving at an aggregator agent that monitors a plurality of end point agents, a signal indicating an out of band operating tolerance of an end point asset;

in response to receiving the signal, gathering at the aggregator agent information associated with a local environment where the end point asset is located, at least by retrieving data available on a computer running the aggregator agent and by querying one or more other end point agents respectively associated with one or more other end point assets, wherein the aggregator agent, the end point asset and the other end point assets are co-located in the local environment;

determining locally at the aggregator agent a priority of said signal based on a rules engine local to the aggregator agent and at least based on the gathered information;

transmitting said priority of said signal and information associated with said signal to a remote host computer for appropriate handling;

wherein the step of determining locally at the aggregator agent a priority further includes downgrading priority of said signal and writing to a local log information associated with the downgraded priority of said signal without immediately transmitting the priority of said signal to the remote host computer; and wherein the step of determining locally at the aggregator agent a priority of said signal further includes re-polling for data from the plurality of end point agents and reassessing said priority based on the repolled data.

16. The program storage device of claim 15, wherein the step of receiving at an aggregator agent includes said aggregator agent polling said plurality of end point agents for profile data.

17. The program storage device of claim 16, wherein the step of determining locally at the aggregator agent further includes using said profile data to determine said priority.

18. The program storage device of claim 17, wherein the step of determining locally at the aggregator agent further includes gathering environment data associated with environment where said aggregator agent is located.

19. The program storage device of claim 15, wherein said local environment is a mobile object.

20. The program storage device of claim 19, wherein said aggregator agent is a plug-in to an onboard computer of the mobile object and said plurality of end point agents are each attached to an item carried in the mobile object.

21. The program storage device of claim 19, wherein said mobile object is a vehicle.

22. The method of claim 1, wherein said aggregator agent is a mobile device.

23. The method of claim 1, wherein said aggregator agent is a smartphone.

* * * * *